(12) United States Patent
Marchal-George et al.

(10) Patent No.: US 6,432,868 B1
(45) Date of Patent: *Aug. 13, 2002

(54) BIMETALLIC CATALYST COMPRISING FLUORINE, AND ITS USE FOR HYDROGENATING AROMATIC COMPOUNDS IN THE PRESENCE OF SULPHURATED COMPOUNDS

(75) Inventors: Nathalie Marchal-George, Saint Genis Laval; Slavik Kasztelan, Rueil Malmaison, both of (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/708,524

(22) Filed: Nov. 9, 2000

(30) Foreign Application Priority Data

Nov. 10, 1999 (FR) ............................................ 99 14142

(51) Int. Cl.[7] .......................... B01J 27/128; B01J 27/13; B01J 21/08; C07C 5/10; C07C 5/02
(52) U.S. Cl. .................. 502/229; 502/230; 502/258; 502/259; 502/260; 502/261; 502/262; 502/326; 502/327; 585/269; 585/270; 585/275; 585/277
(58) Field of Search ................. 502/229, 230, 502/258–262, 326, 327; 585/270, 275, 277, 269

(56) References Cited

U.S. PATENT DOCUMENTS

| | | | | |
|---|---|---|---|---|
| 3,929,619 A | * | 12/1975 | Sinfelt et al. | 208/111 |
| 3,943,053 A | | 3/1976 | Kovach et al. | 208/143 |
| 4,032,474 A | * | 6/1977 | Goudriaan et al. | 252/441 |
| 4,085,157 A | * | 4/1978 | Juguin et al. | 260/673 |
| 4,401,557 A | * | 8/1983 | Juguin et al. | 208/139 |

FOREIGN PATENT DOCUMENTS

| | | |
|---|---|---|
| EP | 0 751 204 A1 | 1/1997 |
| FR | 2006803 | 1/1970 |
| FR | 1.596.032 | 7/1970 |
| FR | 2223337 | 10/1974 |
| FR | 2 695 648 | 3/1994 |

OTHER PUBLICATIONS

English Abstract of RU 2044031—(XP–002140861), Sep. 20, 1995.

* cited by examiner

Primary Examiner—Mark L. Bell
Assistant Examiner—Patricia L. Hailey
(74) Attorney, Agent, or Firm—Millen, White, Zelano & Branigan, P.C.

(57) ABSTRACT

The invention concerns a catalyst comprising at least two group VIII metals, chlorine, fluorine, and at least one amorphous oxide matrix. The catalytic composition is such that the fluorine content is 1.5% by weight or more of the total catalyst mass. The invention also concerns the use of this catalyst in hydrogenating aromatic compounds contained in feeds comprising sulphurated compounds.

22 Claims, No Drawings

BIMETALLIC CATALYST COMPRISING FLUORINE, AND ITS USE FOR HYDROGENATING AROMATIC COMPOUNDS IN THE PRESENCE OF SULPHURATED COMPOUNDS

FIELD OF THE INVENTION

The present invention relates to a supported catalyst based on a group VIII metal and comprising at least two halogens. The invention also relates to the use of this catalyst in a process for hydrotreating hydrocarbon-containing feeds containing small amounts of sulphur and in particular for hydrogenating aromatic compounds contained in such feeds.

Hydrotreatment processes are routinely used in operations for refining petroleum cuts to improve the characteristics of the finished products in terms of the specifications required to satisfy product quality and pollution requirements.

Currently, gas oil cuts, whether from distillation or from a conversion process such as catalytic cracking, contain non negligible quantities of aromatic compounds, nitrogenated compounds and sulphurated compounds. The current legislation in the majority of industrialised countries requires that fuel for use in engines must contain less than 500 parts per million (ppm) of sulphur. In the very near future, this maximum quantity will be reduced to 350 ppm by 2000 then to 50 ppm for 2005 for the member states of the European community. Regarding the polyaromatic compound content in gas oils, this amount is in danger of being reduced to a very low level (of the order of 1% to 2%) from 2005. Thus hydrogenating the polyaromatics contained in gas oil cuts is becoming increasingly important because of the new sulphur and aromatic compound specifications for that type of fuel.

Desulphurisation is generally carried out under conditions and for catalysts that are not capable of simultaneously hydrogenating aromatic compounds. Thus a first treatment of the cut has to be carried out to reduce the sulphur content followed by a second treatment to hydrogenate the aromatic compounds contained in that cut. That second step is generally carried out by bringing the cut into contact with a catalyst generally based on a noble metal, in the presence of hydrogen. However, because the desulphurisation process can never completely eliminate the sulphurated and nitrogenated compounds, the catalysts used must be capable of operating in the presence of such compounds and as a result must have active phases with good thio-resistant properties.

The aim of the present invention is to provide a novel catalyst for desulphurising petroleum cuts and hydrogenating aromatics and polyaromatics present in those cuts.

PRIOR ART

Catalysts based on noble metals are known for their performance in hydrogenating aromatic compounds. However, they are extremely sensitive to the presence of sulphur, which is a powerful inhibitor of the activity of noble metals. To avoid poisoning by the sulphur in the hydrogenating phase, it appears preferable that the metals are deposited on an acid support such as alumina or silica alumina.

When using an alumina type support (U.S. Pat. No. 3,943,053), it has been reported that the quantities of metal have to be precisely controlled as well as the preparation conditions. This constraint causes obvious problems as regards flexibility when extrapolating such formulations to an industrial scale. The use of supports based on silica-alumina has also been reported. Examples which can be cited are U.S. Pat. No. 4,960,505, U.S. Pat. No. 308 814 and U.S. Pat. No. 5 151 172. Those different documents disclose that the type of zeolite for producing the desired properties is highly specific. Further, the use of such supports has some major disadvantages, including preparation, which includes a forming step requiring the use of mineral binders such as aluminas. The preparation methods must thus allow selective deposition of noble metals on the zeolitic material over deposition on the binder, which has an additional specificity linked to such a catalyst type.

To increase the acidity of platinum/alumina type catalysts J. P. Franck, et al (CR Acad. Sci. Paris, Series C, t284 (1977), 297), and J. Cosyns et al., (CR Acad. Sci. Paris, Series C, t284 (1978) 85) have incorporated a limited quantity of halogen, in particular fluorine, into the catalytic composition.

A number of patents describe metal catalysts comprising at least one halogen for use in processes for hydrogenating aromatic compounds. In particular European patent application EP-A-0 751 204 describes a process for hydrogenating aromatic compounds with injection of chlorine into a catalyst based on a noble metal and containing at least 1% of a halogen to increase the hydrogenating activity of the catalyst.

U.S. Pat. No. 3 943 053 describes a method for hydrogenating aromatic compounds using a catalyst comprising two noble metals, namely platinum and palladium, and a quantity of chlorine in the range 1.2% to 2.5% by weight.

European patent application EP-A-0 955 090 describes a catalyst comprising two noble metals (Pt and Pd), fluorine and chlorine. The catalytic composition is such that the fluorine content is in the range 0.5% to 1.5% by weight and the chlorine content is in the range 0.3% to 2% by weight.

SIGNIFICANCE OF THE INVENTION

The Applicant has discovered that a catalyst used in hydrotreatment processes and in particular for hydrogenating aromatic compounds, comprising at least two distinct metals from group VIII of the periodic table, chlorine and fluorine, and at least one amorphous oxide matrix, the catalytic composition being such that the quantity of fluorine represents at least 1.5% by weight of the total catalyst mass, results in better performances as regards the degree of hydrogenation of the aromatic compounds than prior art catalysts comprising either a single group VIII metal or a small amount of halogen. The high degree of conversion of the aromatic compounds to the corresponding saturated compounds obtained with the catalyst of the invention is linked to the surprising synergistic effects of the association of metals on the one hand and the combination of halogens present in higher quantities than in the prior art on the other hand. This high degree of hydrogenation results in very good resistance to sulphur for the catalyst.

The catalyst of the invention can advantageously be used to carry out hydrodesulphurisation and hydrogenation of aromatic compounds present in hydrocarbon feeds comprising sulphurated compounds. More particularly, the hydrocarbon feeds which can be treated using the catalyst of the invention are hydrocarbon feeds containing aromatic compounds, more particularly gas oil cuts from distilling crude oil and various processes for converting cuts known as cycle oils, from catalytic cracking processes. The sulphur content of feeds that can be treated using the process of the invention is less than 2000 ppm by weight, preferably 0.01 to 500 ppm by weight. This catalyst is also suitable for any process aimed at hydrogenating all or a portion of the aromatic compounds of a feed containing traces of sulphurated compounds, such as hydrogenating aromatic compounds in to food oils and in solvents.

DESCRIPTION OF THE INVENTION

The catalyst of the invention contains at least two metals from group VIII of the periodic table, distinct from each other, at least one amorphous oxide matrix, chlorine and fluorine.

The term "amorphous oxide matrix" as used below means a matrix with no elements that are catalytically active contained in its structure.

The catalyst of the invention is characterized in that the quantity of fluorine represents at least 1.5% by weight of the total mass of said catalyst.

Said catalyst combines at least one metal M1 from group VIII selected from the group formed by palladium, rhodium, nickel and cobalt with a metal M2 from group VIII selected from the group formed by platinum, iridium, osmium and ruthenium. The M1/M2 atomic ratio is preferably in the range 0.1/1 to 10/1.

The catalyst of the present invention comprises, as a percentage by weight with respect to the total catalyst mass:
  78% to 98.3% of at least one amorphous oxide material;
  0.1% to 10% of at least two metals from group VIII of the periodic table wherein at least one first metal M1 is preferably selected from the group formed by palladium, rhodium, nickel and cobalt, and at least one second metal M2 is preferably selected from the group formed by platinum, iridium, osmium and ruthenium. The M1/M2 atomic ratio is advantageously in the range 0.1/1 to 10/1;
  at least 1.5%, preferably at most 20% of fluorine. Advantageously, the quantity of fluorine is in the range 1.8% to 15%, more preferably in the range 2% to 10%;
  0.1% to 10% of chlorine.

The amorphous oxide matrix used as a support is selected from transition aluminas, silicas and silica aluminas, and mixtures thereof. This type of support has a specific surface area, determined by techniques that are known to the skilled person, in the range 100 to 600 $m^2/g$, preferably in the range 150 to 500 $m^2/g$. The amorphous oxide matrix can be used in the form of a powder or it can be pre-formed in the form of beads or extrudates.

The supported catalyst of the invention can be prepared using any of the methods that are well known to the skilled person.

Preferably, the catalyst is obtained by depositing chlorine and the group VIII metals onto a support containing the amorphous oxide matrix and fluorine, hereinafter termed the fluorinated support. The fluorinated support is preferably obtained by introducing fluorine in the form of hydrofluoric acid, ammonium fluoride, ammonium hydrogen fluoride or organofluorinated compounds during forming of the amorphous oxide matrix. The fluorinated support then obtained has a specific surface area, determined using known techniques, in the range 100 to 500 $m^2/g$, preferably in the range 150 to 420 $m^2/g$.

The other components of the catalyst can then be introduced separately into the catalyst, using successive addition steps using solutions of one or more elements, or simultaneously, using a common solution of the elements. A plurality of impregnating solutions can be used to obtain the catalyst, in which case it is advantageous to carry out drying or activation steps (calcining or reduction) between each impregnation step.

In a preferred implementation of the invention, the amorphous oxide matrix is brought into contact with the fluorinated compound to form a support containing at least 1.5% by weight of fluorine, then the chlorianted compound is introduced into the fluorinated support either separately or simultaneously during impregnation of the metals.

The catalyst preparation is generally completed by heat treatment in air (calcining). Before use, the catalyst is optionally reduced by passing a gaseous mixture containing hydrogen over the catalyst heated to a temperature which is generally in the range 50° C. to 600° C.

The halogenated compounds used to prepare the catalyst are preferably added by means of an aqueous solution prepared from the corresponding mineral acids, for example hydrofluoric acid HF or hydrochloric acid HCl. Decomposition of an organofluorinated compound and/or organochlorinated compound onto the catalyst is a method which may also be suitable for preparing the catalyst of the invention. This method is particularly advantageous in the case of fluorine as it can avoid the now restricted use of hydrofluoric acid solutions when preparing the catalyst. Examples of organochlorinated compounds are dichloromethane, trichloromethane, dichloroethane, trichloroethane, tetrachloroethylene, hexachloroethane and chloroform.

Group VIII metal precursors which can be used are conventional precursors that are well known to the skilled person. For the non noble metals, nitrates, sulphates, phosphates, halides, for example, chlorides, bromides and fluorides, carboxylates, for example acetates and carbonates, are advantageously used. Regarding the noble metals, nitrates are preferred when they exist, halides, for example chlorides, acids such as chloroplatinic acid or chloroiridic acid, alkali metal chlorometallates, chloro or hydroxoamminated complexes and oxychlorides such as ammoniacal ruthenium oxychloride. It is also possible to use coordination complexes that are soluble in organic solvents, such as acetylacetonate complexes. Carbonyl complexes can also be used.

The catalyst of the invention can be used to treat hydrocarbon cuts. In particular, it can be used in a process for hydrogenating aromatic compounds present in feeds containing sulphurated compounds.

The feed which can be treated by the process using the catalyst of the invention has sulphur contents of less than 2000 ppm by weight, preferably 0.5 to 500 ppm by weight.

Further, depending on the sulphur content of the feed to be treated, it may be advantageous to pre-treat the feed, to reduce its sulphur content by conventional hydrotreatment processes.

One advantage of the catalyst of the invention is that it has good thio-resistant properties, such that low residual amounts of sulphur do not affect the activity of the catalyst.

The aromatic hydrogenation process of the invention is generally carried out at temperatures of 100° C. to 400° C., preferably 150° C. to 380° C. The operating pressure is generally 0.1 to 30 MPa, preferably 1 to 20 MPa. The space velocity (HSV), expressed as the volume of liquid feed treated per unit volume of catalyst per hour, is generally 0.1 to 20 $h^{-1}$. The hydrogen/feed ratio used, expressed as the volume of hydrogen measured under normal conditions per unit volume of liquid feed, is generally 50/1 to 2000/1.

The following examples illustrate the invention without limiting its scope.

EXAMPLE 1

Preparation of Alumina Support

We produced large quantities of an alumina-based support to be able to prepare the catalysts described below from the same formed support. To this end, we used a matrix composed of ultra fine tabular boehmite or alumina gel sold by Condé a Chemie GmbH under the trade name SB3. This gel was mixed with an aqueous solution containing 66% nitric acid (7% by weight of acid per gram of dry gel) then mixed for 15 minutes. Following mixing, the paste obtained was passed through a die with cylindrical orifices with a diameter of 1.3 mm. The extrudates were then dried overnight at 120° C. and calcined at 550° C. for 2 hours in moist air containing 7.5% by volume of water. This produced cylindrical extrudates 1.2 mm in diameter with a specific surface area of 243 $m^2/g$, a pore volume of 0.61 $cm^3/g$ and a unimodal pore size distribution centred on 10 nm. Analysis of the matrix by X ray diffraction showed that it was composed solely of low crystallinity cubic gamma alumina.

EXAMPLE 2

Preparation of a Fluorinated Support

We produced an alumina-based support containing fluorine. To this end, we used a matrix composed of ultra fine tabular boehmite or alumina gel sold by Condéa Chemie GmbH under the trade name SB3.This gel was mixed with an aqueous solution containing 66% nitric acid (7% by weight of acid per gram of dry gel) then mixed for 15 minutes using a Z arm mixer. Fluorine was then introduced in the form of ammonium fluoride to introduce 4% by weight of fluorine, and mixing was carried out for a further 10 minutes. Following mixing, the paste obtained was passed through a die with cylindrical orifices with a diameter of 1.3 mm. The extrudates were then dried overnight at 120° C. and calcined at 550° C. for 2 hour in moist air containing 7.5% by volume of water. Cylindrical extrudates 1.2 mm in diameter were obtained with a specific surface area of 223 $m^2/g$ and a pore volume of 0.66 $cm^3/g$, containing 3.76% of fluorine. Analysis of the matrix by X ray diffraction showed that it was composed solely of low crystallinity cubic gamma alumina.

EXAMPLE 3

Preparation of Catalyst A: Pt-Pd/alumina +Cl +F (not in accordance with the invention)

The method used consisted of successively introducing the elements using an excess of solution from the support of Example 1. The chlorine was introduced first, then the fluorine and then the platinum. The support was successively treated with a 2% Cl HCl solution for 30 minutes to obtain the desired quantity of chlorine on the support. After eliminating the solution, a hydrofluoric acid solution was brought into contact with the chlorinated support for 1h 30 minutes. The support was then rinsed and platinum impregnation was carried out using hexachloroplatinic acid. After 12 hours of exchange, the catalyst was dried in dry air for 2 hours at 530° C. After reducing this catalyst, the palladium was deposited in a neutral atmosphere by excess impregnation with a precise quantity of palladium bis-acetylaceonate. The catalyst was dried then calcined for 2 hours at 350° C. Catalyst (A) obtained contained:

0.15% by weight of platinum;
0.55% by weight of palladium;
0.95% by weight of chlorine;
0.52% by weight of fluorine.

EXAMPLE 4

Preparation of Catalyst B: Pt-Pd/fluorinated Alumina (in accordance with the invention)

The method used consisted of successively introducing the elements using an excess of solution from the fluroinated support of Example 2. The platinum was introduced with the chlorine, then the palladium. The platinum was impregnated using hexachloroplatinic acid dissolved in a 2% Cl hydrochloric acid solution. After 12 hours of exchange, the catalyst was dried in dry air for 2 hours at 530° C. After reducing this catalyst, the palladium was deposited in a neutral atmosphere by excess impregnation with a precise quantity of palladium bis-acetylaceonate. The catalyst was dried then calcined for 2 hours at 350° C. Catalyst (B) obtained contained:

0.15% by weight of platinum;
0.54% by weight of palladium;
0.76% by weight of chlorine;
3.44% by weight of fluorine.

EXAMPLE 5

Hydrogenating Conversion for an LCO Type Feed

In this example, the catalysts obtained as described in the preceding examples were evaluated by means of a catalytic test carried out under the following operating conditions:

total pressure: 60 bars;
feed: hydrotreated LCO;
reactor: in upflow mode.

Before use, the catalyst underwent an activation step in a stream of hydrogen at 450° C. for 2 hours. This reduction could be carried out either in the catalytic test reactor (in situ conditions) or in an associated reduction cell (ex situ conditions).

Table 2 below shows the characteristics of the hydrotreated LCO type feed.

TABLE 2

| Characteristics | LCO feed |
|---|---|
| Density at 20° C. | 0.898 |
| Sulphur (ppm) | 128 |
| Nitrogen (ppm) | 110 |
| Distillation (° C.) | |
| Initial point | 171 |
| 10% by volume | 238 |
| 50% by volume | 301 |
| 90% by volume | 377 |
| end point | 405 |
| Aromatic compound composition (weight %) | |
| Mono-aromatics | 37 |
| Di-aromatics | 15 |
| Tri-aromatics | 2 |
| Total | 54 |
| AC* (weight %) | 30 |

(*)AC = Aromatic carbon, measured by NMR.

The catalytic performances of the catalysts described in the preceding examples were then evaluated during a catalytic test carried out under the following operating conditions:

| | |
|---|---|
| total pressure | 60 bars; |
| HSV (space velocity) | 1l of liquid feed/l of catalyst/hour; |
| Temperature | 280° C.; |
| H$_2$/feed ratio | 450 Nl/Nl of feed |

Table 3 below shows the aromatic conversion obtained with catalysts A and B. the LCO feed used contained 128 ppm of S by weight.

TABLE 3

| LCO feed | Catalyst A | Catalyst B |
|---|---|---|
| AC* initial feed (weight %) | 30 | |
| AC* effluent (weight %) | 23 | 15 |
| % ACDH** | 23.3 | 50.0 |

*AC= aromatic carbon, measured by NMR;
**ACDH= aromatic carbon degree of hydrogenation.

It can be seen that catalyst B was superior in terms of conversion and thus sulphur resistance than catalyst A because of the large amount of fluorine present in catalyst B. A large amount of fluorine thus proved to have a positive effect on the activity of an association of two group VIII metals. This type of catalyst thus enables feeds containing relatively large amounts of sulphur to be treated by having a high hydrogenating activity.

What is claimed is:

1. A catalyst comprising chlorine and fluorine and at least one amorphous oxide matrix, and at least two distinct metals from group VIII, wherein the quantity of fluorine represents at least 1.5% by weight of the total catalyst mass.

2. A catalyst according to claim 1, wherein the quantity of fluorine is at most 20% by weight of the total catalyst mass.

3. A catalyst according to claim 1, wherein the quantity of fluorine is in the range 1.8% to 15% by weight of the total catalyst mass.

4. A catalyst according to claim 1, wherein the quantity of fluorine is in the range 2% to 10% by weight of the total catalyst mass.

5. A catalyst according to claim 1, containing with respect to the total mass, 78% to 98.3% of at least one amorphous oxide matrix. 0.1% to 10% of at least two group VIII metals, and 0. 1% to 10% of chlorine.

6. A catalyst according to claim 1, containing at least one metal M1 from group VIII selected from the group consisting of palladium, rhodium, nickel and cobalt and at least one metal M2 from group VIII selected from the group consisting of platinum, iridium, osmium and ruthenium.

7. A catalyst according to claim 6, having an M1/M2 atomic ratio in the range of 0.1/1 to 10/1.

8. A catalyst according to claim 1, wherein the amorphous oxide matrix is alumina, silica or silica-alumina.

9. A process for preparing a catalyst according to claim 1, comprising first contacting the amorphous oxide support with fluorine to form a fluorinated support, then introducing the chlorine and group VIII metals onto the fluorinated support simultaneously or separately.

10. A process comprising contacting a hydrocarbon cut with a catalyst according to claim 1.

11. A process according to claim 10, comprising hydrogenating aromatic compounds present in hydrocarbon cuts comprising sulphur.

12. A process according to claim 11, a process carried out at temperatures of 100° C. to 400° C., at an operating pressure of 0.1 to 30 MPa, at a space velocity, expressed as the volume of liquid feed treated per unit volume of catalyst per hour, in the range 0.1 to 20, with a hydrogen/feed ratio of 50/1 to 2000/1 by volume of hydrogen per unit volume of feed.

13. A catalyst according to claim 6, wherein the quantity of fluorine is at most 20% by weight of the total catalyst mass.

14. A catalyst according to claim 6, wherein the quantity of fluorine is in the range 1.8% to 15% by weight of the total catalyst mass.

15. A catalyst according to claim 7, wherein the quantity of fluorine is in the range 2% to 10% by weight of the total catalyst mass.

16. A catalyst according to claim 2, containing, with respect to the total mass, 78% to 98.3% of at least one amorphous oxide matrix 0.1%to 10% of at least two group VIII metals, and 0.1% to 10% of chlorine.

17. A catalyst according to claim 16, containing at least one metal M1 from group VIII selected from the group consisting of palladium, rhodium, nickel and cobalt and at least one metal M2 from group VIII selected from the group consisting of platinum, iridium, osmium and ruthenium.

18. A catalyst according to claim 17, having an M1/M2 atomic ratio in the range of 0.1/1 to 10/1.

19. A catalyst according to claim 18, wherein the amorphous oxide matrix is alumina, silica or silica-alumina.

20. A catalyst according to claim 19, wherein the amorphous oxide matrix comprises low crystallinity cubic gamma alumina containing fluorine.

21. A catalyst according to claim 1, prepared by a process comprising first contacting the amorphous oxide support with fluorine to form a fluorinated support, then introducing the chlorine and group VIII metals onto the fluorinated support simultaneously or separately.

22. A catalyst according to claim 20, prepared by a process comprising first contacting the amorphous oxide support with fluorine to form a fluorinated support, then introducing the chlorine and group VIII metals onto the fluorinated support simultaneously or separately.

* * * * *